United States Patent [19]
Alves et al.

[11] Patent Number: 5,093,869
[45] Date of Patent: Mar. 3, 1992

[54] PATTERN RECOGNITION APPARATUS UTILIZING AREA LINKING AND REGION GROWTH TECHNIQUES

[75] Inventors: James F. Alves, Calabasas; Jerry A. Burman, Westlake Village; Victoria Gor, Canoga Park; Michele K. Daniels, Northridge; Walter W. Tackett, Canoga Park; Craig C. Reinhart, Moorpark; Bruce A. Berger, Simi Valley; Brian J. Birdsall, Canoga Park, all of Calif.

[73] Assignee: Hughes Aircraft Company, Los Angeles, Calif.

[21] Appl. No.: 633,833

[22] Filed: Dec. 26, 1990

[51] Int. Cl.$^5$ ................................ G06K 9/48
[52] U.S. Cl. ............................ 382/22; 382/37
[58] Field of Search ..................... 382/5, 22, 37

[56] References Cited

U.S. PATENT DOCUMENTS

| | | | |
|---|---|---|---|
| 3,725,576 | 4/1973 | Crawford et al. | 358/126 |
| 3,794,272 | 2/1974 | Hecker | 364/604 |
| 3,955,046 | 5/1976 | Ingham et al. | 358/126 |
| 4,047,154 | 9/1977 | Vitels et al. | 382/5 |
| 4,115,803 | 9/1978 | Morton | 382/22 |
| 4,183,013 | 1/1980 | Agrawala et al. | 382/22 |
| 4,267,562 | 5/1981 | Raimondi | 358/109 |
| 4,783,829 | 11/1988 | Miyakawa et al. | 382/22 |
| 4,876,729 | 10/1989 | Watanabe et al. | 382/22 |
| 4,971,266 | 11/1990 | Mehltretter et al. | 364/447 |

Primary Examiner—Leo H. Boudreau
Assistant Examiner—Barry Stellrecht
Attorney, Agent, or Firm—C. D. Brown; R. M. Heald; W. K. Denson-Low

[57] ABSTRACT

Image data is processed by a low level feature detection processor that extracts low level features from an image. This is accomplished by converting a matrix of image data into a matrix of orthogonal icons that symbolically represent the image scene using a predetermined set of attributes. The orthogonal icons serve as the basis of processing by means of a high level graph matching processor which employs symbolic scene segmentation, description, and recognition processing that is performed subsequent to the low level feature detection. This processing generates attribute graphs representative of target objects present in the image scene. High level graph matching compares predetermined attributed reference graphs to the sensed graphs to produce a best common subgraph between the two based on the degree of similarity between the two graphs. The high level graph matching generates a recognition decision based on the value of the degree of similarity and a predetermined threshold. The output of the high level graph matching provides data from which a target aimpoint is determined, and this aimpoint is coupled as an input to a missile guidance system that tracks identified targets.

16 Claims, 6 Drawing Sheets

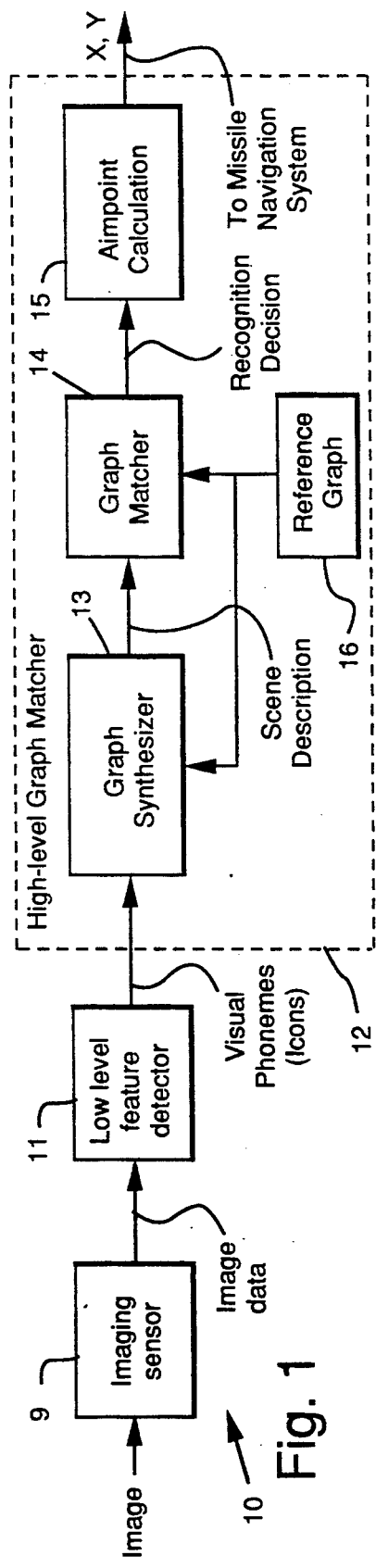
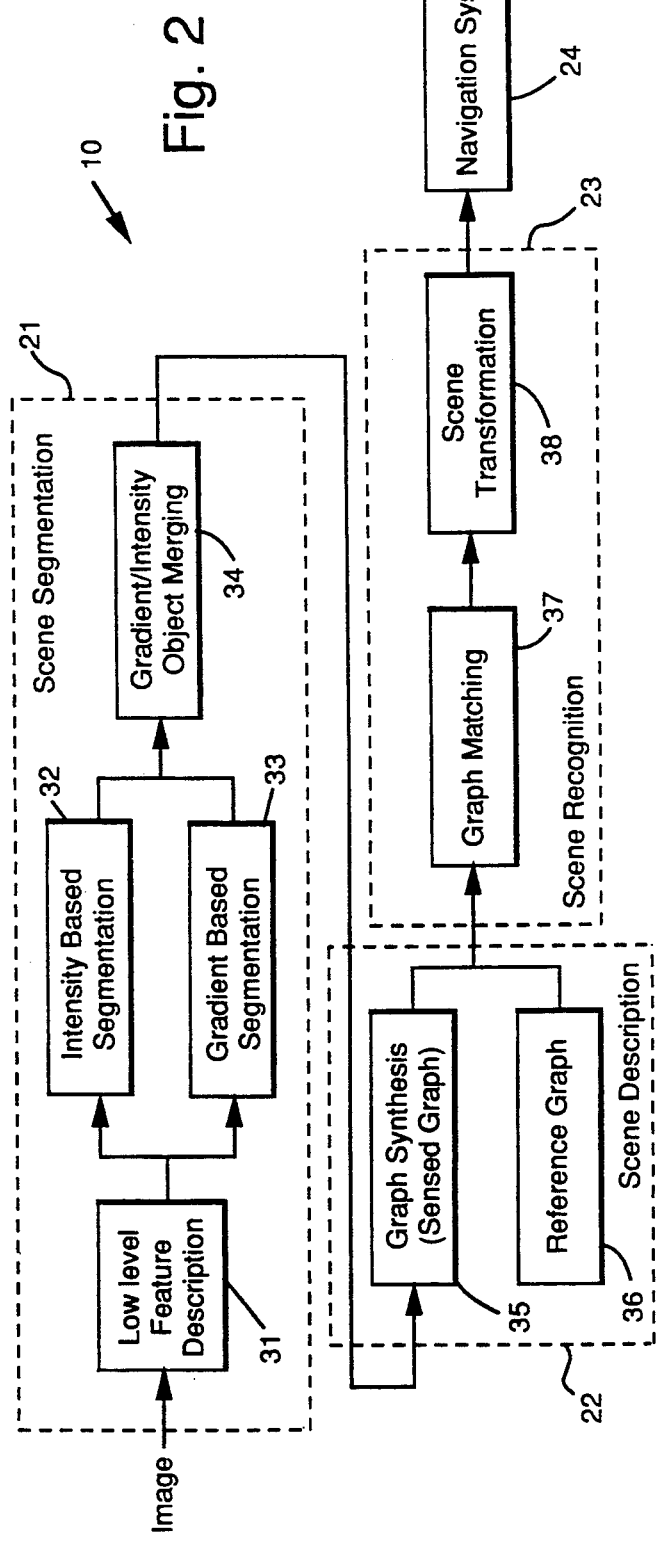

Flat linking results

Region growth results

Flat linking and region growth

Boundary formation

Linear feature extraction

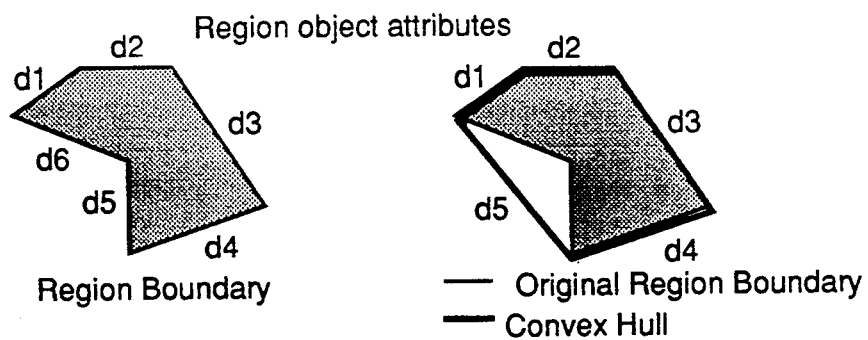
Region object attributes
Perimeter = d1+d2+d3+d4+d5+d6
Area = (standard computation of polygon area)
$$\text{Centroid }(X,Y) = \frac{\sum (\text{midpoint of segment}) \times (\text{length of segment})}{\text{number of segments}}$$
Similar equations apply for the convex hull polygon
Fig. 6
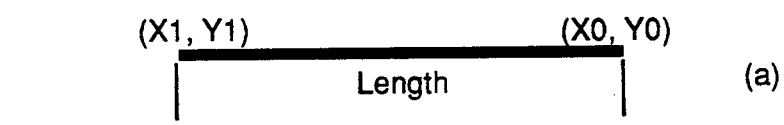
(a)
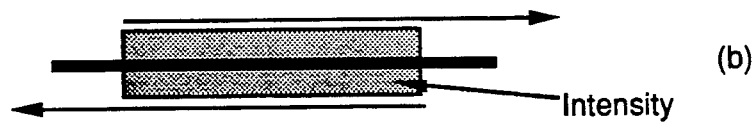
(b)
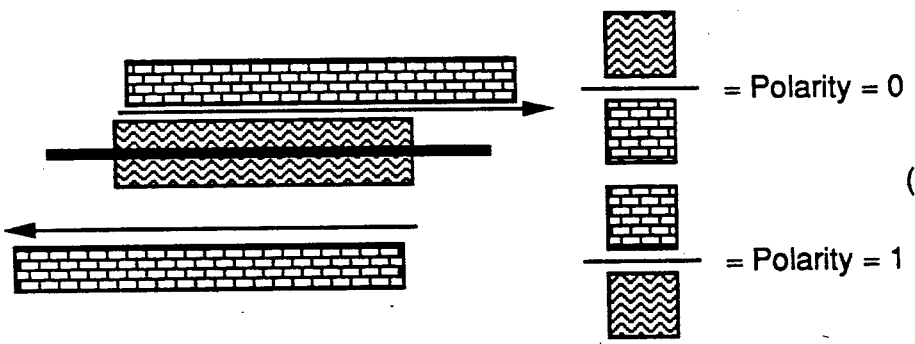
(c)
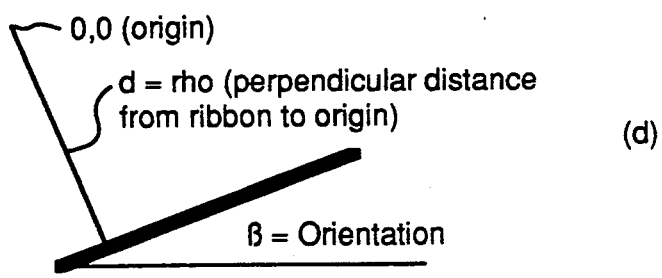
(d)
Fig. 7

Fig. 8a
Scene Objects
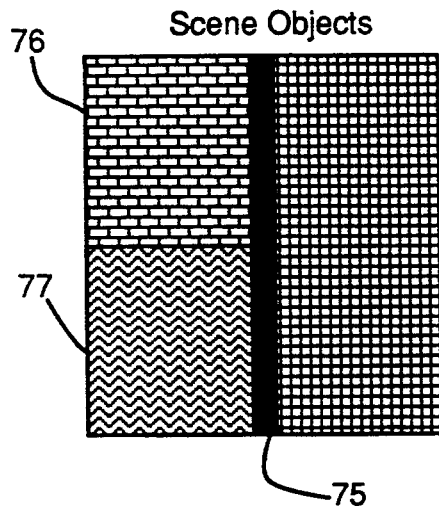
Fig. 8b
Segmentation
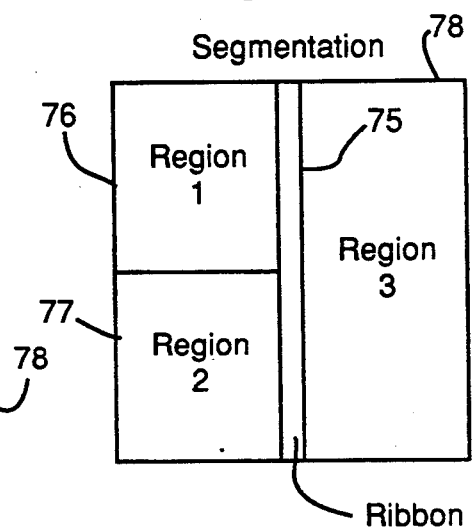
Attributed Graph
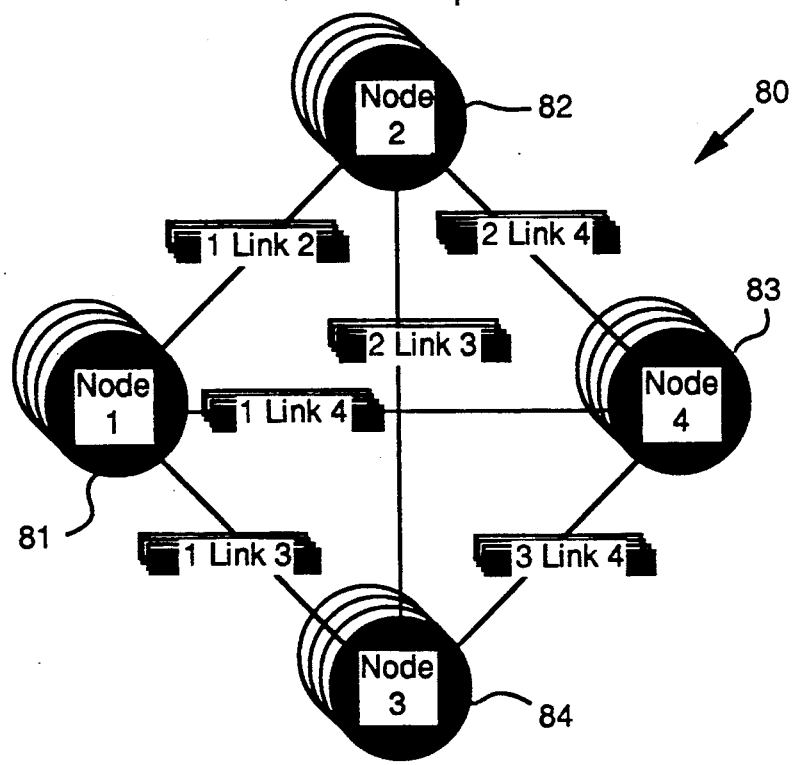
Fig. 8c

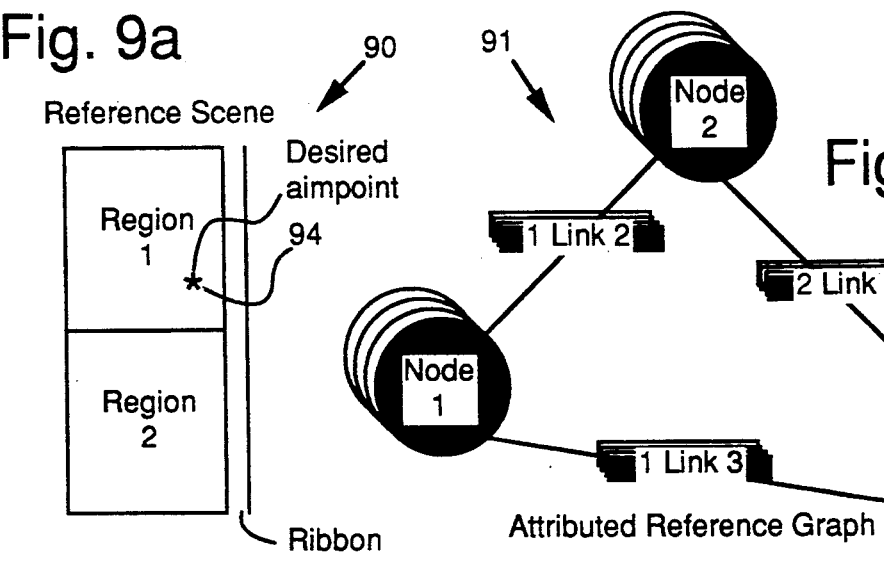
Fig. 9a
Fig. 9b
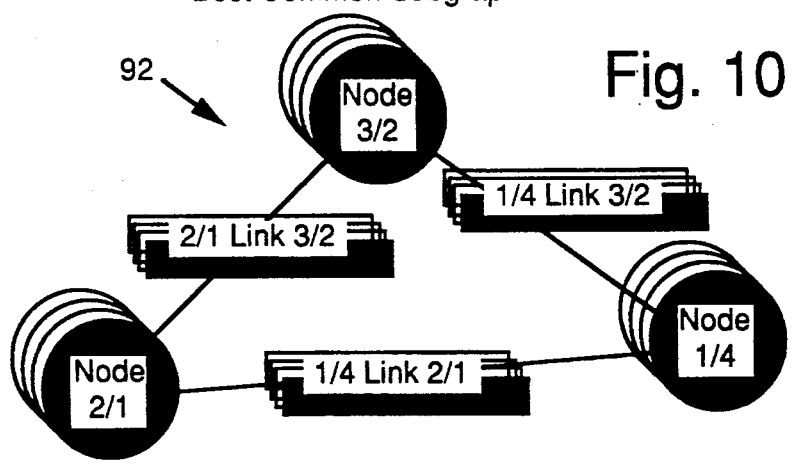
Fig. 10
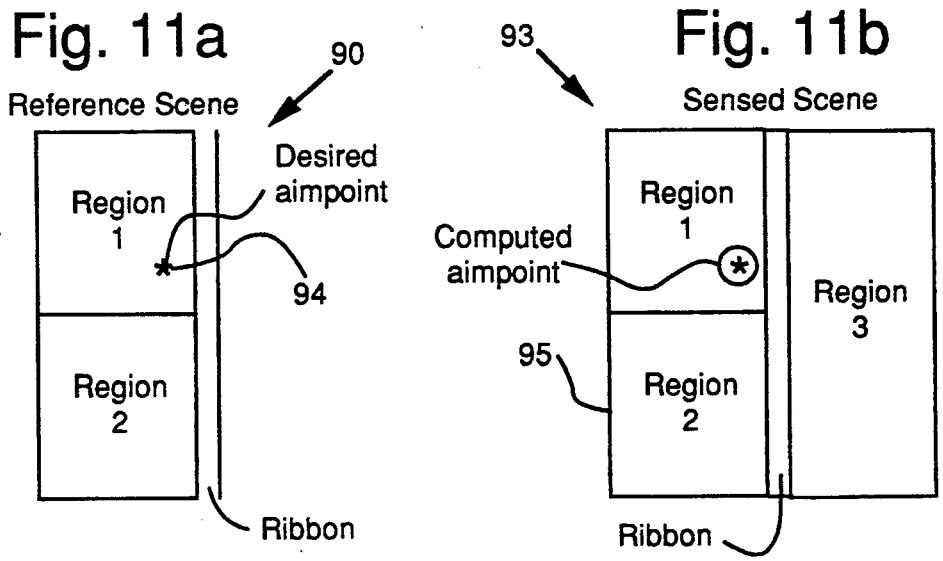
Fig. 11a   Fig. 11b

PATTERN RECOGNITION APPARATUS UTILIZING AREA LINKING AND REGION GROWTH TECHNIQUES

CROSS REFERENCE TO RELATED APPLICATIONS

The present application is related to patent applications Ser. No. 514,778 filed on Apr. 25, 1990, entitled "Improved Data Compression System and Method," and Ser. No. 514,779 filed on Apr. 25, 1990, entitled "Improved Data Decompression System and Method," whose teachings are incorporated herein by reference.

BACKGROUND

The present invention relates generally to scene recognition systems and methods, and more particularly, to a scene recognition system and method that employs low and high level feature detection to identify and track targets.

Modern missile scene recognition systems employ specialized signal processing architectures and algorithms that are designed to quickly and efficiently detect the presence of particular target objects such as buildings, trucks, tanks, and ships, and the like that are located in the field of view of the missile. Consequently, more sophisticated designs are always in demand that can accurately identify or classify targets in a very short period of time.

SUMMARY OF THE INVENTION

The present invention comprises a scene recognition system and method for use with a missile guidance and tracking system, that employs low and high level feature detection to identify and track targets. The system employs any conventional imaging sensor, such as an infrared sensor, a millimeter wave or synthetic aperture radar, or sonar, for example, to image the scene. The output of the sensor (the image) is processed by a low level feature detection processor that extracts low level features from the image. This is accomplished by converting a matrix of sensor data (image data) into a matrix of orthogonal icons that symbolically represent the image using a predetermined set of attributes. The orthogonal icons serve as the basis for processing by means of a high level graph matching processor which employs symbolic scene segmentation, description, and recognition processing that is performed subsequent to the low level feature detection. The process generates attributed graphs representative of target objects present in the image. The high level graph matching processor compares predetermined attributed reference graphs to the sensed graphs to produce a best common subgraph between the two, based on the degree of similarity between the two graphs. The high level graph matching processor generates a recognition decision based on the value of the degree of similarity and a predetermined threshold. The output of the high level graph matching processor provides data from which an aimpoint is determined. The aimpoint is coupled as an input to the missile guidance system that tracks an identified target.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a block diagram of a scene recognition system employing low and high level feature detection to identify and track targets in accordance with the principles of the present invention;

FIG. 2 is a detailed functional block diagram of the system of FIG. 1;

FIGS. 6 and 7 show attributes computed for region and ribbon objects, respectively, in object formation processing performed in the scene segmentation section of FIG. 2;

FIGS. 8a-8c show the transitional steps in generating an attributed sensed graph; and FIGS. 9a and 9b show a reference scene and an attributed reference graph, respectively;

FIG. 10 shows a best common subgraph determined by the graph matching section of the scene recognition portion of FIG. 2; and FIGS. 11a and 11b show a reference scene and a sensed scene having the respective aimpoints designated therein.

DETAILED DESCRIPTION

Figure 3A:
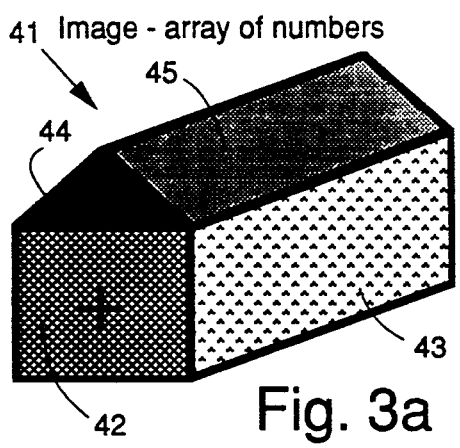
FIGS. 3a-3f show the processing performed to achieve low level feature detection.

Referring to the drawings, FIG. 1 is a block diagram of a scene recognition system employing low and high level feature detection to identify and track targets in accordance with the principles of the present invention. The system comprises a low level feature detector 11 that is adapted to receive image data derived from an imaging sensor 9, such as an infrared sensor, a television sensor, or a radar, for example. The low level feature detector 11 is coupled to a high level graph matching processor 12 that is adapted to process icons representative of features contained in the image scene that are generated by the low level feature detector 11. Aimpoint information is generated and used by a missile navigation system 24 to steer a missile toward a desired target.

The high level graph matching processor 12 includes a serially coupled graph synthesizer 13, graph matcher 14, and aimpoint estimator 15. A reference graph storage memory 16 is coupled to the graph matching processor 12 and is adapted to store predefined graphs representing expected target objects that are present in the image scene. The reference graphs include graphs representing tanks, buildings, landmarks, and water bodies, for example.

The low level feature detector 11 is described in detail in U.S. patent applications Ser. No. 514,779 filed on Apr. 25, 1990, entitled "Improved Data Decompression System and Method," whose teachings are incorporated herein by reference. In summary, however, the low level feature detector 11 converts a matrix of sensor data (image data) into a matrix of orthogonal icons that symbolically represent the imaged scene through the use of a set of attributes. These are discussed in more detail below with reference to FIGS. 3-11.

The processing performed by the scene recognition system shown in FIG. 1 employs a series of transformations that converts image information into pregressively more compressed and abstract forms. The first transformation performed by the low level feature detector 11 converts the sensor image, which is an array of numbers describing the intensity at each picture position, into a more compact array of icons with attributes that described the essential intensity distributions of 10×10 pixel blocks of image data.

The second transformation implemented in the high level graph matching processor 12 links the icon array into separate regions of nearly uniform intensity and identifies linear boundaries between regions. A special case of a region that is long and narrow with roughly parallel sides is identified as a ribbon. This transformation results in a list of the objects formed, various attributes of the objects themselves, and relationships between the objects. This information is encoded in a structure identified as an attributed graph.

The graph matcher 14 compares the graph structure derived from the sensor image with a previously stored graph derived earlier or from reconnaissance information, for example. If a high degree of correlation is found, the scene described by the reference graph is declared to be the same as the scene imaged by the sensor. Given a match, the aimpoint estimator 15 associates the aimpoint given apriori in the reference graph to the sensed graph, and this information is provided as an input to the missile navigation and guidance system.

In a classical graphing application, the general problem of correlating two graphs is N-P complete, in that a linear increase in the number of nodes requires an exponential increase in the search, or number of comparisons, required to match the graphs. In the present invention, this problem is solved by overloading the sensed and reference graphs with unique attributes that significantly reduces the search space and permits rapid, real time searching to be achieved.

FIG. 2 is a detailed functional block diagram of the system of FIG. 1. Scene segmentation processing 21 comprises low level feature description processing, intensity and gradient based segmentation processing 32, 33 and gradient/intensity object merging 34, all performed by the low level feature detector 11 (FIG. 1). Output signals from the scene segmentation processing 21 are coupled to scene description processing 22 that comprises graph synthesis processing 35 that produces a sensed graph of objects present in the image. Reference graphs 36 are stored that comprise graphs representing vehicles, buildings, landmarks, and water bodies, for example. These graphs are prepared from video data gathered during reconnaissance flights, for example, which provide mission planning information. Target objects that are present in the video data are processed by the present invention to generate the reference graphs which are ultimately used as comparative data from which target objects are identified and selected during operational use of the invention.

Scene recognition processing 23 employs the graphs generated by the graph synthesis processing 35 and the reference graphs 36 by means of graph matching processing 37 and scene transformation processing 38 which generate the aimpoint estimate that is fed to the navigation system 24.

FIGS. 3a-3f show the processing performed to achieve low level feature discrimination. This process converts a matrix of sensor data (image data) into a matrix of orthogonal icons that represent the imaged scene symbolically via a set of attributes. These orthogonal icons serve as the basis for performing symbolic scene segmentation, description, and recognition processor shown in FIG. 2. FIG. 3a represents an image of a house 41 whose sides 42, 43 and roof sections 44, 45 have different shading due to the orientation of the sun relative thereto. Each face of the house 41 is identified by a different texture (shading) identified in FIG. 3a. The image of the house 41 is an array of numbers representative of different intensities associated with each pixel of data.

Figure 3B:
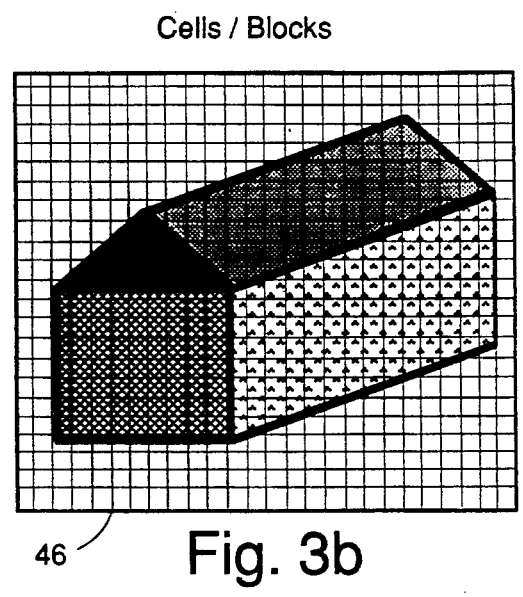
Figure 3C:
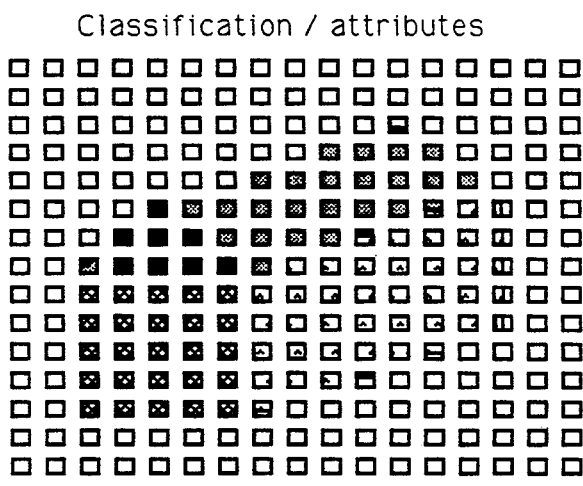

The image data representing the house 41 is processed by a 10×10 block window 46 as is roughly illustrated in FIG. 3b which generates pixel data illustrated in FIG. 3c. The pixel data of FIG. 3c is generated in the low level feature detector 11. This pixel data contains orthogonal icons. Each pixel in FIG. 3c is shaded in accordance with the shade it sees in FIG. 3b. The blocks or cells of data shown in FIG. 3c are generated in the low level feature detector 11.

Figure 3D:
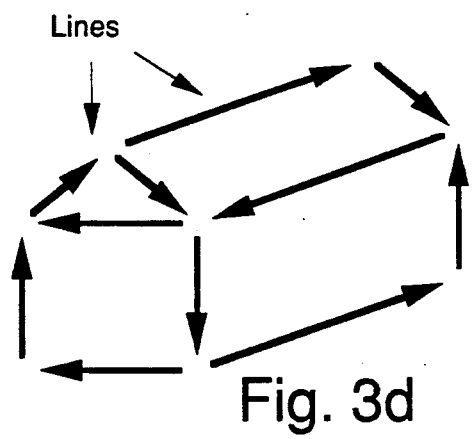
Figure 3E:
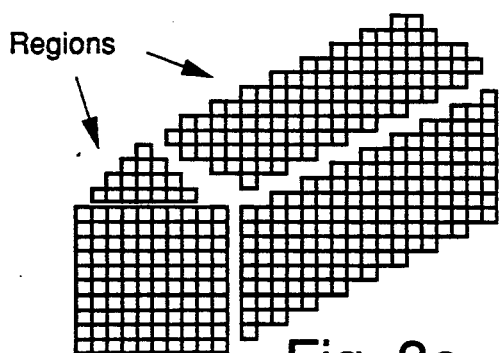
Figure 3F:
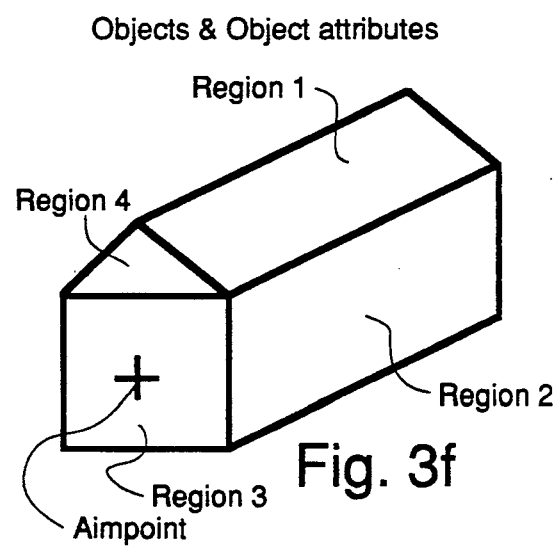

In FIG. 3d lines are formed, and in FIG. 3e regions are formed from the shaded pixels in FIG. 3c. The lines are generated by gradient based segmentation processing 33 in the scene segmentation processor 21 shown in FIG. 2, while the regions are generated by the intensity based segmentation processing 32 in the scene segmentation processor 21 shown in FIG. 2. The regions are formed using flat linking and gradient linking and the region shapes are determined. The line and region information is then processed by gradient/intensity object merging 34 and the graph synthesis processing 35 shown in FIG. 2. in order to form regions and ribbons, and a graph is synthesized, as illustrated in FIG. 3f, which is a graph representation of the house 41 of FIG. 3a. An aimpoint is shown in FIG. 3f that is derived from the information comprising the reference graph 36 shown in FIG. 2.

The flat linking and region growth processing is part of the scene segmentation processing 21 of FIG. 2. This flat linking and region growth processing is comprised of two subprocesses. The flat linking process groups low level feature discrimination orthogonal icons of type FLAT into homogeneous intensity flat regions using a relaxation-based algorithm. The result is a set of regions comprised of FLAT icons and described by their area (number of constituent FLAT icons), intensity (average intensity of the constituent FLAT icons), and a list of the constituent FLAT icons. More particularly, groups of orthogonal icons having homogeneous intensity regions are formed to generate a set of regions having a block resolution boundary. The groups of orthogonal icons are comprised of homogeneous intensity icons described by their area, including the number of constituent icons having homogeneous intensity, the average intensity of the constituent homogeneous intensity icons, and a list of the constituent homogeneous intensity icons, region growth processing appends adjacent orthogonal icons having an intensity gradient thereacross to provide a feature-resolution boundary.

The region growth process appends adjacent orthogonal icons of type gradient (non FLAT) information to the grown flat regions thus providing a feature-resolution boundary as opposed to the 10×10 block resolution boundary provided by the flat linking process. The method employed is as follows. (1) Being with a flat region provided by the flat linking process. The region is comprised solely of FLAT icons and grows up to flanking gradient icons which stop the growth. (2) Consider the gradient icons flanking the region. Each gradient icon is described by a bi-intensity model of which one of the intensities are adjacent to the flat region. If this intensity is similar to the intensity of the flat region extend the region boudary to include the portion of the gradient icon covered by the intensity. (3) Repeat for all flat regions. Flat linking assigns a single region number to every FLAT icon. Region growth assigns multiple region numbers to gradient icons. Gradient icons of type EDGE and CORNER are assigned two region numbers, those of type RIBBON are assigned three region numbers. Gradient icons of type SPOT are not considered. The result of this process is a set of homogeneous intensity regions consisting of FLAT icons and partial gradient icons. This is described in detail in the "Improved Data Decompression System and Method" patent application cited above.

Figure 4A:
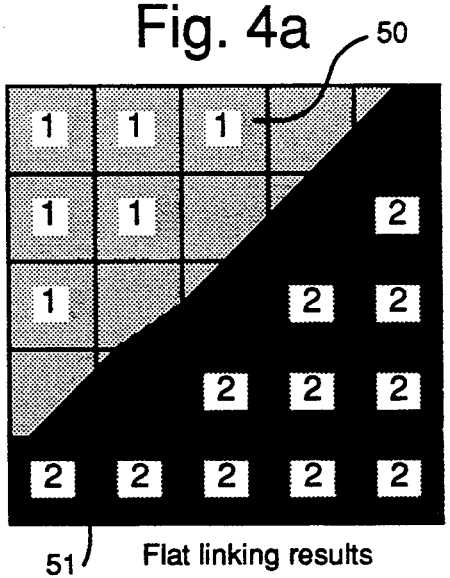
FIGS. 4a and 4b show the results of flat linking and region growth processing performed in the scene segmentation section of FIG. 2.
Figure 4B:
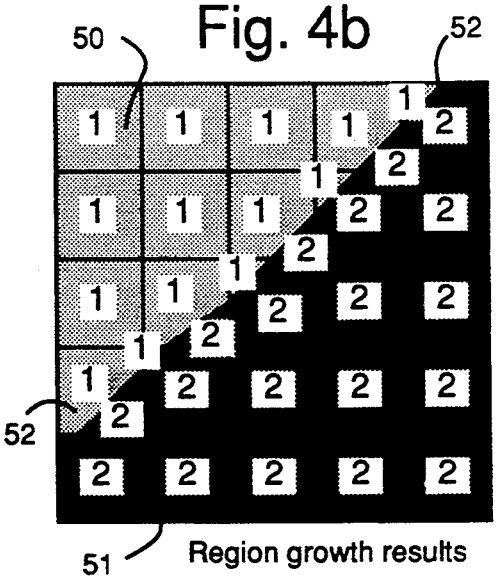

FIGS. 4a and 4b show the results of flat linking and region growth processing performed by the scene segmentation processing 21 of FIG. 2. In particular this processing is performed by intensity based segmentation processing 32, gradient based segmentation processing 33, and the gradient/intensity object merging 34 processes shown in FIG. 2. In FIGS. 4a and 4b, the orthogonal icons containing a single shade of gray represent FLAT icons 50, 51. Those that contain two shades of gray (along the diagonal) represent EDGE icons 52. Regions are comprised of both FLAT and gradient (non FLAT) icons. EDGE icons 52, as well as all other gradient icons, are associated with multiple regions, that is, they are assigned multiple region numbers. In FIGS. 4a and 4b, each of the EDGE icons 52 are assigned two region numbers, 1 and 2. This provides us with boundaries that are accurate to the gradient features detected by the low level feature discrimination process.

Boundary formation and linear feature extraction processing is performed by the scene segmentation processing of FIG. 2. This processing is comprised of three subprocesses. The gradient boundaries of each region 60-63 (FIG. 5a) are traversed forming a gradient chain around each region. The gradient chains for each region are analyzed for linear segments 64-68 (FIG. 5b) and having pointers inserted into the chains at the beginning and end of each linear segment 64-68. The linear segments 64-68 are analyzed for the presence of adjacent segments related to two or more regions that form line segments. The results of these processes include boundary descriptions for each of the regions 60-63 formulated by the flat linking and region growth processes, and linear segments 70-73 (FIG. 5c) represented by length, orientation, and end point coordinates.

Figure 5A:
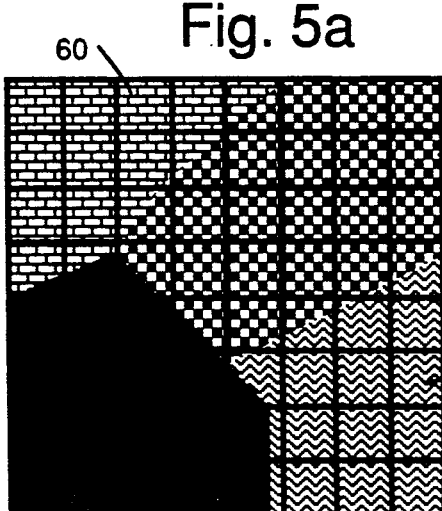
FIGS. 5a-5c show the results of boundary formation and linear feature extraction processing performed in the scene segmentation section of FIG. 2.
Figure 5B:
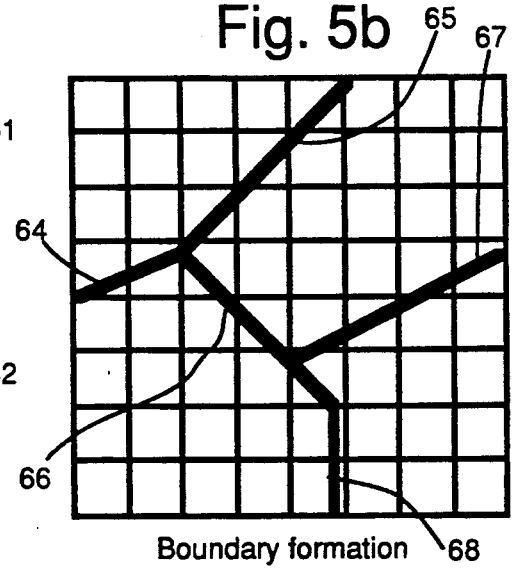
Figure 5C:
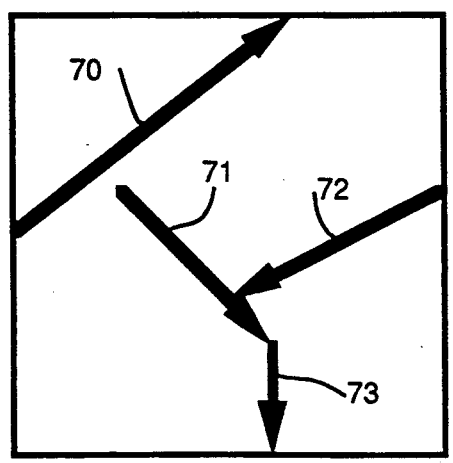

FIGS. 5a-5c show the results of boundary formation and linear feature extraction processing performed in the scene segmentation processing 21 of FIG. 2. FIG. 5a shows the regions 60-63 derived by the flat linking and region growth process. FIG. 5b shows the boundary descriptions of each of the regions 60-63 as derived by the boundary formation process. FIG. 5c shows the line segments 70-73 derived by the linear feature extraction process.

The object formation process is comprised of two subprocesses. The first forms ribbon objects 75 from the linear features provided by the gradient boundary and linear feature extraction processes and creates symbolic descriptions of these objects. The second creates symbolic descriptions of the regions provided by the flat linking and region growing processes thus producing region objects 76-78 (FIGS. 8a, 8b). These ribbon and region objects become the nodes of the attributed sensed graph. The symbolic descriptions serve as the attributes. FIGS. 6 and 7 show attributes computed for region and ribbon objects 75-78, shown in FIGS. 8a and 8b, respectively, in object formation processing performed by the scene segmentation process 21 of FIG. 2, and more particularly by the graph synthesis processing 35 in FIG. 2.

FIG. 6 shows region object attributes and computations for a region boundary and a convex hull using the equations shown in the drawing. With reference to FIG. 7, it shows the ribbon object attributes, including ribbon length in FIG. 7a, ribbon intensity in FIG. 7b, polarity in FIG. 7c, and ribbon orientation in FIG. 7d. The arrows shown in FIGS. 7b and 7c are indicative of the orientation of the line segments that constitute the ribbon.

For region objects, the process computes the area, perimeter, and convex hull attributes. For ribbon objects, the process searches through a line table looking for pairs of lines that: (1) differ in orientation by 180 degrees, (2) are in close proximity to each other, (3) are flanked by similar intensities, and (4) do not enclose another line segment that is parallel to either line. When a pair of lines fitting these constraints is found the ribbon attributes for them are computed. The attributes for ribbon objects include: (1) intensity of the ribbon, (2) polarity of the ribbon (light on dark or dark on light), (3) the width of the ribbon (distance between two lines), and (4) the orientation of the ribbon.

The graph synthesis process and its associated graph language computes relational descriptions between the region and ribbon objects 75-78 (FIGS. 8a, 8b) provided by the object formation process and formulates the attributed sensed graph structure from the region and ribbon objects and their relationships. The relationships between every region/region, region/ribbon, and ribbon/ribbon pair are computed. The relationships are of type spatial (proximity to one another) or comparative (attribute comparisons). Graphs, nodes, links between nodes, and graph formation and processing is well known in the art and will not be described in detail herein. One skilled in the art of graph processing should be able to derive the graphs described herein given a knowledge of the attributes that are to be referenced and the specification of the graphs described herein.

In formulating the attributed sensed graph, the region and ribbon objects are placed at graph nodes, one object per node, along with their descriptive attributes. The relationships between each pair of objects are placed at the graph arcs (links) along with their attributes. With this scheme, a fully connected attributed graph is formulated which symbolically represents the original imaged scene.

FIGS. 8a-8c show the transitional steps in generating an attributed sensed graph 80 in the graph synthesis process 35 (FIG. 2). The graph 80 is comprised of nodes 81-84, that symbolically represent objects within the scene, and node attributes that describe the objects, and arcs (or links) that symbolically represent the relationships between the objects within the scene, and link attributes, that describe the relationships between the objects. More particularly, node 1 is representative of region 1 object 76, node 2 is representative of region 2 object 77, node 3 is representative of region 3 object 78, and node 4 is representative of the ribbon object 75. The various links between the ribbon and region objects 75-78 are shown as 1 link 2, 2 link 4, 1 link 4, 1 link 3, 2 link 3, and 3 link 4. The links include such parameters as the fact that the region 1 object 76 is above and adjacent the region 2 object 77, that the region 1 object 76 is left of the region 3 object 78, that the region 2 object 77 is left and adjacent to the ribbon object 75, and so forth.

Reference graph processing entails the same functions as the object formation and graph synthesis processes with two differences. First, it is performed prior to the capture of the sensed image and subsequent scene segmentation and description. Second, it receives its inputs from a human operator by way of graphical input devices rather than from autonomous segmentation processes.

FIGS. 9a and 9b show a reference scene 90 and an attributed reference graph 91, respectively. FIG. 9a shows the reference scene 90 comprised of region 1 and region 2, the ribbon and a desired aimpoint 94. The attributed reference graph 91 shown in FIG. 9b is comprised of nodes and links substantially the same as is shown in FIG. 8c, The nodes and links comprise the same types of relationships described with reference to FIG. 8c.

The graph matching process 37 (FIG. 2) compares attributed reference and attributed sensed graphs, generates a best common subgraph between the two based on the degree of similarity between the two graphs (confidence number), and generates a recognition decision based on the value of the confidence number and a predetermined threshold. Feasibility is determined by the degree of match between the node and are attributes of each of the graphs. A heuristic procedure is included to ignore paths that cannot produce a confidence number larger than the predetermined threshold. Also, paths which lead to ambiguous solutions, that is, solutions tha match a single object in one graph to multiple objects in the other are, ignored. Finally, path that do not preserve the spatial relationships between the objects as they appeared in the original scene are ignored.

FIG. 10 shows a best common subgraph 92 determined by the graph matching section of the scene recognition processing 23 of FIG. 2. The graph shown in FIG. 8c is matched against the graph shown in FIG. 9b which generates the common subgraph 92 of FIG. 10. This is performed in a conventional manner well-known in the graph processing art and will not be described in detail herein.

FIGS. 11a and 11b show a reference scene 90 and a sensed scene 93 having their respective aimpoints 94, 95 designated therein. More particularly, FIGS. 11a and 11b depict one possible scenario in which an object is detected in the sensed scene (region 3) but is not designated in the reference graph. An appropriate aimpoint is designated in spite of this difference as well as others including object additions or omissions, object size and shape differences, and changes due to imaging conditions. The aimpoint 94 in the reference scene 90 is included in the attributed reference graph and is indicative of a desired target aiming location. This aimpoint is "transferred" to the sensed scene as the aimpoint that the missile should be directed at. This information is transferred to the missile navigation system for its use.

Thus there has been described a new and improved scene recognition system and method that employs low and high level feature detection to identify and track targets. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A scene recognition system employing low and high level detection to identify and track targets located in an image scene and a missile guidance system adapted to steer a missile toward a desired target, said system comprising:

low level feature detection processor means for processing image data derived from and representative of an imaged scene, and for extracting features from the imaged scene by converting the image data into a matrix of orthogonal icons that symbolically represent the image using a predetermined set of attributes, said low level feature detection processor means comprising:

a) flat linking processing means for forming groups of orthogonal icons having homogeneous intensity regions to generate a set of regions having a block resolution boundary and that are comprised of homogeneous intensity icons described by their area, comprising the number of constituent icons having homogeneous intensity, the intensity, comprising the average intensity of the constituent homogeneous intensity icons, and a list of the constituent homogeneous intensity icons; and b) region growth processing means coupled to the flat linking processing means for appending adjacent orthogonal icons having an intensity gradient thereacross to provide a feature-resolution boundary;

graph synthesis processor means coupled to the low level feature detection processing means for processing the orthogonal icons to generate predetermined objects representative of objects that are in the scene, and for computing relational descriptions between the objects to form an attributed sensed graph from the objects and their relationships as described by their attributes, and whereupon the objects are placed at graph nodes, one object per node, along with their descriptive attributes, and wherein the relationships between object pairs are placed at graph links along with their attributes, and whereupon a fully connected attributed graph is formulated which symbolically represents the image scene;

reference graph storage means coupled to the graph synthesis processing means for storing predetermined reference graphs representative of identifiable targets of interest that are expected to be present in the data comprising the image; and graph matching processing means coupled to the graph synthesis processing means for comparing predetermined attributed reference graphs to the sensed graphs to produce an object recognition decision based on the value of the degree of similarity between the attributed reference graphs to the sensed graphs and a predetermined threshold, and for providing an output signal that is determinative of a target aimpoint, which output signal is coupled as an input to the missile guidance system to provide a guidance signal that is adapted to steer the missile toward the identified target.

2. The system of claim 1 wherein the low level feature detection processing means further comprises:

boundary formation and linear feature extraction processing means coupled to the region growth processing means for (1) traversing the gradient boundaries of each region to form a gradient chain around each region, (2) analyzing the gradient chains for each region for linear segments by means of pointers inserted into the chains at the beginning and end of each linear segment, and (3) analyzing the linear segments for the joining of segments related to two or more regions to form linear segments, which generates boundary descriptions for each of the regions formulated by the flat linking and region growth processing means and linear segments represented by length, orientation, and end point coordinates.

3. The system of claim 2 wherein the low level feature detection processing means further comprises:

object formation processing means coupled to the boundary formation and linear feature extraction processing means for forming ribbon objects from the linear features provided by the gradient boundary and linear feature extraction processing means and for creating symbolic descriptions of these objects, by creating symbolic descriptions of the regions provided by the flat linking and region growing processing means to produce region objects that define nodes of an attributed sensed graph, and whose symbolic descriptions comprise the attributes;

whereby for region objects, the object formation processing means computes the area, perimeter, and convex hull attributes, and for the ribbon objects, the object formation processing means searches through a line table looking for pairs of lines that: (1) differ in orientation by 180 degrees, (2) are in close proximity to each other, (3) are flanked by similar intensities, (4) do not enclose another line segment that is parallel to either line, and when a pair of lines fitting these constraints is found the ribbon attributes for them are computed, and wherein the attributes for ribbon objects include: (1) intensity of the ribbon, (2) polarity of the ribbon, meaning light on dark or dark on light, (3) the width of the ribbon, meaning the distance between the two lines, and (4) the orientation of the ribbon.

4. The system of claim 3 wherein the graph matching processing means compares predetermined attributed reference graphs to the sensed graphs to produce a best common subgraph between the two based on the degree of similarity between the two graphs, and generates a recognition decision based on the value of the degree of similarity and a predetermined threshold.

5. The system of claim 4 wherein the graph matching processing means utilizes a heuristically directed depth-first search technique to evaluate feasible matches between nodes and arc attributes of the attributed reference and sensed graphs.

6. The system of claim 5 wherein the graph matching processing means determines feasibility by the degree of match between the node and arc attributes of each of the graphs, and a heuristic procedure is included to ignore paths that cannot produce a degree of similarity larger than the predetermined threshold.

7. The system of claim 6 wherein the paths which lead to ambiguous solutions, comprising solutions that match a single object in one graph to multiple objects in the other, are ignored, and wherein paths that do not preserve the spatial relationships between the objects as they appeared in the image are ignored.

8. A scene recognition system employing low and high level feature detection to identify and track targets located in an imaged scene and a missile guidance system adapted to steer the missile toward a desired target, said system comprising:

low level feature detection processing means adapted to process image data derived from and representative of an image scene, for extracting low level features from the image by converting the image data into a matrix of orthogonal icons that symbolically represent the image scene using a predetermined set of attributes;

graph synthesis processing means coupled to the low level feature detection processing means processing the orthogonal icons and for computing relational descriptions between the region and ribbon objects provided by the object formation processing means to form the attributed sensed graph from the region and ribbon objects and their relationships, and whereupon the region and ribbon objects are placed at graph nodes, one object per node, along with their descriptive attributes, the relationships between each pair of objects are placed at the graph links along with their attributes, whereupon, a fully connected attributed graph is formulated which symbolically represents the image;

reference graph storage means coupled to the graph synthesis processing means for storing predetermined reference graphs representative of identifiable targets of interest that are expected to be present in the data comprising the image; and graph matching processing means coupled to the graph synthesis processing means for comparing predetermined attributed reference graphs to the sensed graphs to produce an object recognition decision, which produces a best common subgraph between the two based on the degree of similarity between the two graphs, for generating a recognition decision based on the value of the degree of similarity and a predetermined threshold, and for providing an output signal that is determinative of a target aimpoint, which output signal is coupled as an input to the missile guidance system to provide a guidance signal that is adapted to steer the missile toward the identified target.

9. A scene recognition system employing low and high level feature detection to identify and track targets located in an image scene, said system comprising:

low level feature detection processing means adapted to process image data derived from and representative of an image scene, for extracting low level features from the image scene by converting the image data into a matrix of orthogonal icons that symbolically represent the image using a predetermined set of attributes;

flat linking processing means coupled to the low level feature detection processing means for forming groups of orthogonal icons having homogeneous intensity regions by means of a relaxation-based algorithm to generate a set of regions having a block resolution boundary and that are comprised of homogeneous intensity icons described by their area, comprising the number of constituent icons having homogeneous intensity, the intensity, comprising the average intensity of the constituent homogeneous intensity icons, and a list of the constituent homogeneous intensity icons;

region growth processing means coupled to the flat linking processing means for appending adjacent orthogonal icons having an intensity gradient thereacross to provide a feature-resolution boundary;

boundary formation and linear feature extraction processing means coupled to the region growth processing means for (1) traversing the gradient boundaries of each region to form a gradient chain around each region, (2) analyzing the gradient chains for each region for linear segments by means of pointers inserted into the chains at the beginning and end of each linear segment, and (3) analyzing the linear segments for the joining of segments related to two or more regions to form linear segments, which generates boundary descriptions for each of the regions formulated by the flat linking and region growth processing means and linear segments represented by length, orientation, and end point coordinates;

object formation processing means coupled to the boundary formation and linear feature extraction processing means for forming ribbon objects from the linear features provided by the gradient boundary and linear feature extraction processing means and for creating symbolic descriptions of these objects, by creating symbolic descriptions of the regions provided by the flat linking and region growing processing means to produce region objects that define nodes of an attributed sensed graph, and whose symbolic desctiptions comprise the attributes;

whereby for region objects, the object formation processing means computes the area, perimeter, and convex hull attributes, and for the ribbon objects, the object formation processing means searches through a line table looking for pairs of lines that: (1) differ in orientation by 180 degrees, (2) are in close proximity to each other, (3) are flanked by similar intensities, (4) do not enclose another line segment that is parallel to either line, and when a pair of lines fitting these constraints is found the ribbon attributes for them are computed, and wherein the attributes for ribbon objects include: (1) intensity of the ribbon, (2) polarity of the ribbon, meaning light on dark or dark on light; (3) the width of the ribbon, meaning the distance between the two lines, and (4) the orientation of the ribbon;

graph synthesis processing means coupled to the low level feature detection processing means processing the orthogonal icons and for computing relational descriptions between the region and ribbon objects provided by the object formation processing means to form the attributed sensed graph from the region and ribbon objects and their relationships, and whereupon the region and ribbon objects are placed at graph nodes, one object per node, along with their descriptive attributes, the relationships between each pair of objects are placed at the graph links along with their attributes, whereupon, a fully connected attributed graph is formulated which symbolically represents the imaged scene;

reference graph storage means coupled to the graph synthesis processing means for storing predetermined reference graphs representative of identifiable targets of interest that are expected to be present in the data comprising the image scene; and graph matching processing means coupled to the graph synthesis processing means for comparing predetermined attributed reference graphs to the sensed graphs to produce a best common subgraph between the two based on the degree of similarity between the two graphs, and for generating a recognition decision based on the value of the degree of similarity and a predetermined threshold, and wherein the graph matching processing means utilizes a heuristically directed depth-first search technique to evaluate feasible matches between the nodes and arcs of the attributed reference and sensed graphs, wherein feasibility is determined by the degree of match between the node and arc attributes of each of the graphs, and a heuristic procedure is included to ignore paths of the tree that cannot possibly produce a degree of similarity larger than the predetermined threshold, and wherein the paths of the tree which lead to ambiguous solutions, wherein solutions that match a single object in one graph to multiple objects in the other, are ignored, and wherein paths of the tree that do not preserve the spatial relationships between the objects as they appeared in the original scene are ignored.

10. A method for use with a missile guidance system to track targets located in an imaged scene, said method comprising the steps of:

processing image data derived from and representative of an imaged scene to form groups of orthogonal icons, having homogeneous intensity regions, by means of a relaxation-based algorithm to generate a set of regions having a block resolution boundary and that are comprised of homogeneous intensity icons described by their area, comprising the number of constituent icons having homogeneous intensity, the intensity comprising the average intensity of the constituent homogeneous intensity icons, and a list of the constituent homogeneous intensity icons;

appending adjacent orthogonal icons having an intensity gradient thereacross to provide a feature-resolution boundary;

processing the orthogonal icons to form an attributed sensed graph from region and ribbon objects comprising the orthogonal icons and their relationships, and whereupon the region and ribbon objects are placed at graph nodes, one object per node, along with their descriptive attributes, the relationships between each pair of objects are placed at the graph links along with their attributes, whereupon, a fully connected attributed graph is formulated which symbolically represents the image scene;

storing predetermined reference graphs representative of identifiable targets of interest that are expected to be present in the data comprising the image scene; and comparing predetermined reference graphs to the attributed sensed graphs to produce an object recognition decision, and providing an output signal that is determinative of a target aimpoint, which output signal is coupled as an input to the missile guidance system to provide a guidance signal that is adapted to steer a missile toward the identified target.

11. The method of claim 10 wherein the step of processing image data comprises:

forming regions by (1) traversing the gradient boundaries of each region to form a gradient chain around each region, (2) analyzing the gradient chains for each region for linear segments by means of pointers inserted into the chains at the beginning and end of each linear segment, and (3) analyzing the linear segments for the joining of segments related to two or more regions to form linear segments, which generates boudary descriptions for each of the regions formulated by the flat linking and region growth processing means and linear segments represented by length, orientation, and end point coordinates.

12. The method of claim 11 wherein the step of processing image data comprises:

forming ribbon objects from the linear features provided by the gradient boundary and linear feature extraction processing step and for creating symbolic descriptions of these objects, by creating symbolic descriptions of the regions provided by the flat linking and region growing processing means to produce region objects that define nodes of an attributed sensed graph, and whose symbolic descriptions comprise the attributes;

whereby for region objects, the area, perimeter, and convex hull attributes are determined, and for the ribbon objects, a line table is searched looking for pairs of lines that: (1) differ in orientation by 180 degrees, (2) are in close proximity to each other, (3) are flanked by similar intensities, (4) do not enclose another line segment that is parallel to either line, and when a pair of lines fitting these constraints is found the ribbon attributes for then are computed, and wherein the attributes for ribbon objects include: (1) intensity of the ribbon, (2) polarity of the Ribbon, meaning light on dark or dark on light, (3) the width of the ribbon, meaning the distance between the two lines, and (4) the orientation of the ribbon.

13. The method of claim 12 wherein the comparing step comprises comparing predetermined reference graphs to the attributed sensed graphs based on the value that is a function of the difference between the degree of similarity between the reference and sensed graphs, and a predetermined threshold.

14. The method of claim 13 wherein the comparing step utilizes a heuristically directed depth-first search technique to evaluate feasible matches between nodes and arcs of the attributed reference and sensed graphs.

15. The method of claim 14 wherein the comparing step determines feasibility by the degree of match between the node and arc attributes of each of the graphs, and a heuristic procedure is included to ignore paths that cannot produce a degree of similarity larger than the predetermined threshold.

16. The method of claim 15 wherein the paths which lead to ambiguous solutions, comprising solutions that match a single object in one graph to multiple objects in the other, are ignored, and wherein paths that do not preserve the spatial relationships between the objects as they appeared in the image scene are ignored.

* * * * *